P. E. WIRT.
TIRE BODY CONSTRUCTION.
APPLICATION FILED OCT. 4, 1911.
1,096,659.
Patented May 12, 1914.
2 SHEETS—SHEET 1.
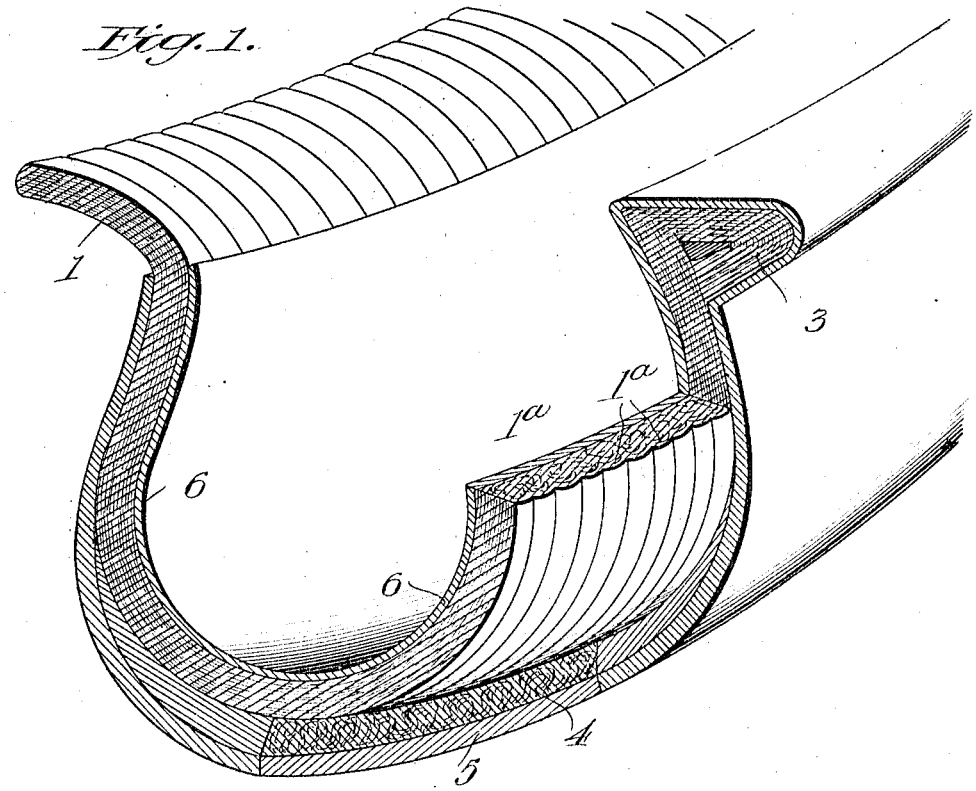
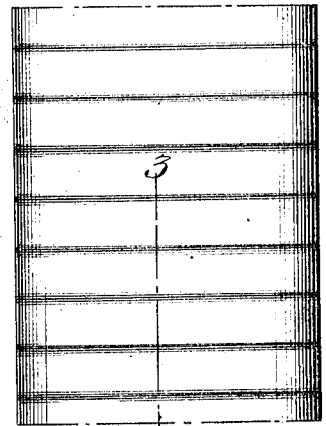
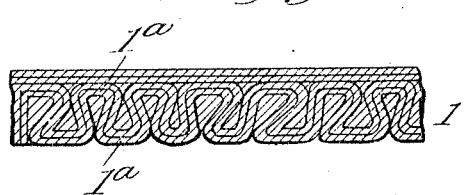
Inventor.
Paul E. Wirt,
Witnesses
By
his Attorney P. E. WIRT.
TIRE BODY CONSTRUCTION.
APPLICATION FILED OCT. 4, 1911.
1,096,659.
Patented May 12, 1914.
2 SHEETS—SHEET 2.
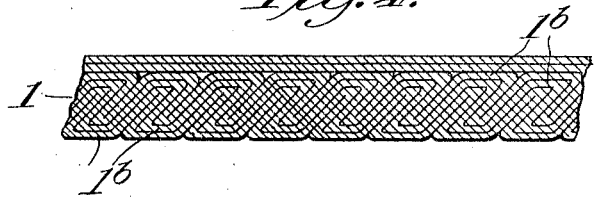
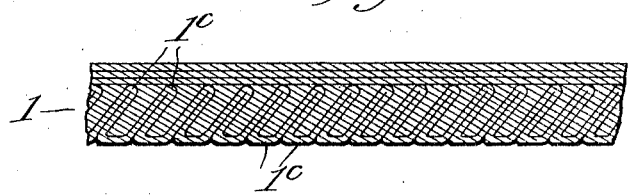
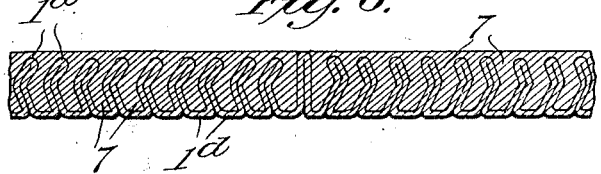
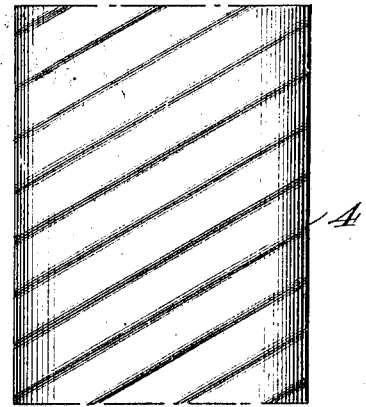
Witnesses
Inventor
Paul E. Wirt,
By
his Attorney

UNITED STATES PATENT OFFICE.

PAUL E. WIRT, OF BLOOMSBURG, PENNSYLVANIA.

TIRE-BODY CONSTRUCTION.

1,096,659.  Specification of Letters Patent.  Patented May 12, 1914.

Continuation of application, Serial No. 554,840, filed April 11, 1910. This application filed October 4, 1911. Serial No. 652,869.

*To all whom it may concern:*

Be it known that I, PAUL E. WIRT, a citizen of the United States, residing at Bloomsburg, in the county of Columbia and State of Pennsylvania, have invented certain new and useful Improvements in Tire-Body Construction, of which the following is a specification.

The present invention contemplates certain new and useful improvements in the construction of tires for automobiles and other vehicles, the primary object thereof being to provide a tire which is peculiarly constructed so as to possess great strength, flexibility and durability, together with marked ability to resist puncture and injury.

To this end, the invention contemplates a novel fabric body material designed to be incorporated in a tire body or casing and primarily formed of closely folded fabric, preferably rubberized, the folded fabric having its fold walls so disposed and related, and so combined with rubber fillings, or other equivalent resilient tying means, as to secure a number of important and practical advantages, hereinafter particularly pointed out, over conventional tire constructions of the character wherein flat layers of fabric are superposed upon each other.

With these and other objects in view, the invention consists in certain novel combinations and arrangements of the parts as will more fully appear as the description proceeds, the novel features thereof being pointed out in the appended claims.

The essential features of the invention, involved in carrying out the objects above indicated, are necessarily susceptible to a wide range of modification without departing from the spirit or scope of the invention, although for illustrative purposes certain preferred embodiments thereof are illustrated in the accompanying drawings, in which:—

Figure 1 is a sectional perspective view of a pneumatic tire casing constructed in accordance with the present invention, the clencher element being completed at one edge of the tire and incomplete at the opposite edge of the tire. Fig. 2 is a plan view of a portion of the tire body, the tread being removed therefrom. Fig. 3 is a sectional view through the same showing one form of the folds of which the body portion is composed, the said folds being crushed so as to flatten the bights and destroy the vertical or upright arrangement thereof; the line of section of Fig. 3 being indicated by the section line 3—3 of Fig. 2, and the view being somewhat exaggerated as to size and openness of the folds. Fig. 4 is a sectional view similar to Fig. 3, but illustrating a folded body material wherein the folds maintain a slanting or oblique disposition with reference to the radii of the wheel, the folded body material being built up of several layers of fabric. Fig. 5 is a similar view showing another form of folded body material which is constructed from a single thickness of fabric, the inner face of the folded body portion having a lining of several thicknesses of fabric which are laid flat upon each other. Fig. 6 is a similar view showing a still further modification in which the folds of the folded body material are crushed so as to destroy the upright or vertical disposition thereof, but are not so closely compacted together, the interstices between the various folds being filled with rubber. Fig. 7 is a plan view similar to Fig. 2, of a portion of the tire body with the tread removed, the folds being shown as extending diagonally thereof.

Corresponding and like parts are referred to in the following description and, indicated in all the views of the drawings by the same reference characters.

In carrying out the present invention a blank strip of fabric body material, is first provided. This strip is formed of flexible rubberized fabric which is gathered into a series of folds 1ª which are preferably compacted and may, as shown in Fig. 3, have a tumbled or upset formation such as may be conveniently produced by crushing the folds. These folds extend transversely of the body material, and they may either extend straight across the same, as indicated in Fig. 2, or be diagonally disposed as indicated in Fig. 7. This folded body portion constitutes the foundation of the tire body, and the edges of the strip are suitably bent to provide the clencher elements 3, while the two ends of the strip 1 may be joined on a form by opening up a fold or two on each end and then interlocking them, the said interlocked ends being crushed together to make a smooth and compact junction. A tread 4 of any suitable construction (preferably of the crushed fold type as shown), may be applied to this foundation, and there is also an outer soft rubber covering 5 which may be of any desired thickness. An inner lining 6 of rubberized fabric or of rubber alone is applied to the folded body portion 1 so as to provide a smooth interior lining or surface for contact with the pneumatic tube.

It is characteristic of the folded material in the present tire body construction, to yield more easily under stress in all directions than is possible with a tire body constructed in the usual manner from superposed flat laid layers of fabric. The folded construction gives a greater amount of radial flexibility owing to the fact that the bights of the folds form interminable close lying hinges, and the entire body being firmly compressed and held together by the rubber, will yield or bend much more easily than is the case with the usual flat laid body formed of several layers of fabric superimposed one upon the other.

A form of the folded body portion 1 is illustrated in Fig. 3 in which it is formed of two thicknesses of fabric, the various folds 1ª being crushed vertically so as to flatten the bights and completely destroy the upright or vertical formation of the folds.

A modification is shown in Fig. 4 in which the body portion is formed with folds 1ᵇ which still retain a parallel relation to each other, although they are crushed so as to be diagonally disposed with respect to the radii of the wheel.

A slightly different modification is shown in Fig. 5 in which the folds 1ᶜ of the body portion are formed of a single ply or thickness of material, the said folds being crushed as in the previous instance so as to assume a diagonal relation to the radii of the wheel.

Attention may also be directed at this point to the modification shown in Fig. 6, in which the folds 1ᵈ of the body portion are crushed so as to destroy the vertical position thereof, but are not so closely compacted together, the spaces between the adjacent folds being filled with rubber ties 7. In forming the clencher elements 3 at the edges of the body portion, the said edges may be thinned down by severe rolling or pressure, thereby enabling them to be more readily worked into the necessary form. Also to be still better prepared to form the clench, the free edges may contain less material by preparing the body material into two or three thicknesses before folding or crushing, and having the ply or thickness whose edges are to form the clench wider than the others that are contained in the body.

Owing to the nature of its construction, the usual flat laid tire body provides no greater strength or bracing resistance at the side walls near the clench, where there is much stress, than at any other portion of the tire; while with the present construction the folded tire body assumes a crowded and consequently a slightly thicker formation near the clench, the said thickness gradually diminishing toward the periphery. In forming the present tire body the folds pack up closely together at or near the clench, and the side walls are consequently thicker there because of the difference in circumference at the clench area, as compared with that at or nearing the periphery. The folds are necessarily crowded closer together at the clench area as the tire is formed over a core, and there follows the slight thickening and consequently a greater crowding and compacting of folds which strengthens and braces the walls at the sides of the tire at or near the clench. This thickness and compacting diminishes, of course, as the folds near the periphery, and this is of great advantage, as it better distributes resistance and resiliency over a strengthened base or foundation at the side walls starting from the clench. It causes the tire to wear much longer and it will not blow out so readily at the clench area.

From the foregoing, it will have been observed that according to the described method of producing the novel fabric body material, the agglomerated folds may be upset from the vertical by a so-called crushing operation, with the result of bringing the adjoining fold walls into overlapping relation and presenting bights which produce flexible hinges for the material. A fundamental feature of this invention involved in this particular construction is that of the walls of the folds being made to overlap as by inclining them or causing them to lie flatwise in the tire in a greater or less degree. I thereby attain many advantages such as the prevention of ripping crosswise of the folds, a greater tractive efficiency than in the ordinary canvas tire, the ability to fill both the larger and smaller circumferences of the tire with folds giving somewhat the general effect of a carcass made of flattened overlapping cords, the prevention of opening of the folds and the better "hinging" at the sides of the tire as distinguished from a fabric having vertical folds, and the attainment of what is substantially equivalent to a series of hollow cords with rubber centers, isolating the walls and threads of the folds from each other, when the fabric employed has a rubberized face or faces. In brief, the overlapping of the fold walls enables the outer as well as the inner periphery of the tire to be filled with folds. It provides suppleness or easy hinging at the sides, prevents ripping across the folds, and gives many of the desirable characteristics of a rubberized cord tire. These folds I prefer to extend diagonally across the tire from edge to edge; thus attaining, in addition to the above advantages, a more direct pull or transmission of tractive strains between the tread and the edges or beads of the casing than when the folds run straight across, besides allowing a greater number of folds of a given width in a given size of tire.

The tread 4 may also be formed of crushed fabric material, although any other suitable form of tread might be employed, the present invention pertaining more particularly to the construction of the tire body proper which constitutes a foundation upon which the tread may be mounted.

It will be noted that the folds of the body portion 1 extend into the clencher elements 3, thereby simplifying the construction of the tire body, and enabling the folded and crushed material to be utilized at the sides of the tire as well as at the tread thereof. By closely folding the case material of rubbered fabric, as shown, instead of disposing it in flat superposed layers as is commonly done, the greatest possible strength from the material used is obtained.

Referring to the construction in which the folds extend obliquely or diagonally across the body, it may be said that one distinct advantage in such a construction is that in laying up or forming the same around a core there is more adaptability in the obliquely folded material. It more readily assumes the tire body shape or configuration and there is less rigidity than where the folds extend at right angles to the surface of the wheel. Oblique folds are necessarily longer and open less readily than folds directly across the wheel, they bend or yield more in a longitudinal direction when in use, and transmit the strains from tread to beads with an approximation to a straight pull along the folds. There is consequently a much greater strength flexibility and resiliency, and this insures greater wear and life to the tire body when in use.

In connection with the foregoing, it will be observed that in the ordinary tire the outer covering of rubber is likely to be loosened by wear and separated from the canvas, but in the folded construction herein described there is more rubber and a more irregular surface for the final exterior cover of rubber to be anchored to and it will last and wear better in consequence.

Hence, it will be noted as one of the practical features of this invention that the folded tire body construction herein described affords a better anchorage for the exterior covering of rubber than the usually flat-laid tire body. The joints between the folds being filled with rubber and the exterior surface of the crushed folds being somewhat irregular or corrugated affords a better surface upon which to weld the exterior soft rubber covering usually imposed upon tires.

This application, as to the fundamental features of tire construction covered thereby, is a continuation of the application for my Patent No. 1,009,365, dated Nov. 21, 1911, which discloses and claims a process for making substantially the same kind of tire body.

Having thus described the invention, what I claim as new and desire to secure by Letters Patent, is:—

1. A tire whose body includes a strip of fabric formed into a series of closely adjacent folds with adjoining fold-walls disposed in overlapping relation, and resilient tying-means connecting the folds and maintaining the walls in said relation.

2. A fabric body-material for tire construction including a strip of fabric having a close succession of diagonally-extending folds with adjoining fold-walls disposed in overlapping relation, and rubber fillings between and about the folds.

3. A fabric body-material for tire construction including a strip of fabric having crushed and agglomerated folds upset from the vertical with adjoining fold-walls disposed in overlapping relation to each other and presenting broad bights which produce flexible hinges for the material, and rubber fillings between and about the folds.

In testimony whereof I hereunto affix my signature in the presence of two witnesses.

PAUL E. WIRT.

Witnesses:
KARL F. WIRT,
C. W. FUNSTON.